United States Patent
Jafarian et al.

(10) Patent No.: US 9,462,550 B2
(45) Date of Patent: Oct. 4, 2016

(54) TARGET WAKEUP TIME (TWT) GROUPING MODIFICATION

(71) Applicant: QUALCOMM Incorporated, San Diego, CA (US)

(72) Inventors: Amin Jafarian, San Diego, CA (US); Bin Tian, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 81 days.

(21) Appl. No.: 14/271,169

(22) Filed: May 6, 2014

(65) Prior Publication Data

US 2014/0334365 A1  Nov. 13, 2014

Related U.S. Application Data

(60) Provisional application No. 61/823,106, filed on May 14, 2013, provisional application No. 61/821,515, filed on May 9, 2013.

(51) Int. Cl.
*H04W 4/00* (2009.01)
*H04W 52/02* (2009.01)
*H04W 76/04* (2009.01)

(52) U.S. Cl.
CPC ..... *H04W 52/0225* (2013.01); *H04W 52/0216* (2013.01); *H04W 52/0219* (2013.01); *H04W 52/0222* (2013.01); *H04W 76/048* (2013.01); *Y02B 60/50* (2013.01)

(58) Field of Classification Search
CPC .................. H04W 52/0225; H04W 52/0216; H04W 52/0219; H04W 52/0222; H04W 76/048; Y02B 60/50
See application file for complete search history.

(56) References Cited

U.S. PATENT DOCUMENTS

| 7,551,948 | B2 * | 6/2009 | Meier | H04L 29/12028 455/405 |
| 8,149,749 | B2 * | 4/2012 | Maeda | H04W 52/028 370/311 |
| 9,001,723 | B1 * | 4/2015 | Singh | H04W 24/00 340/7.32 |
| 2007/0259700 | A1 * | 11/2007 | Meier | H04L 29/12028 455/574 |
| 2009/0279466 | A1 * | 11/2009 | Ji | H04W 52/0232 370/311 |
| 2011/0158216 | A1 | 6/2011 | Zaks | |
| 2011/0205948 | A1 * | 8/2011 | Chen | H04W 76/048 370/311 |
| 2012/0030358 | A1 | 2/2012 | Mackenzie | |
| 2012/0099507 | A1 | 4/2012 | Zhang et al. | |
| 2012/0275364 | A1 * | 11/2012 | Anderson | H04W 52/0219 370/311 |
| 2013/0021957 | A1 * | 1/2013 | Fang | H04W 8/186 370/311 |
| 2013/0155930 | A1 | 6/2013 | Chu et al. | |

(Continued)

FOREIGN PATENT DOCUMENTS

WO  WO-9530217 A1  11/1995
WO  WO-2012165733 A1  12/2012

OTHER PUBLICATIONS

Hsieh J-R. et al., "Power Efficient Multipolling Mechanism for Next Generation Wireless LANs", IEEE VTS Vehicular Technology Conference, Proceedings, IEEE, US, Apr. 1, 2007, pp. 2971-2975, XP831093175, ISBN: 978-1-4244-8266-3.

(Continued)

*Primary Examiner* — Phuc Tran
(74) *Attorney, Agent, or Firm* — Patterson & Sheridan, L.L.P.

(57) ABSTRACT

Certain aspects of the present disclosure provide methods and apparatus for modifications to operation of a group of devices utilizing target wakeup times (TWTs).

46 Claims, 6 Drawing Sheets

(56) References Cited

U.S. PATENT DOCUMENTS

| | | | |
|---|---|---|---|
| 2013/0229959 A1 | 9/2013 | Ghosh et al. | |
| 2013/0250832 A1* | 9/2013 | Kim | H04W 52/0216 370/311 |
| 2014/0314054 A1* | 10/2014 | Seok | H04W 8/26 370/336 |
| 2015/0341880 A1* | 11/2015 | Seok | H04L 7/0008 370/350 |
| 2016/0021680 A1* | 1/2016 | Choi | H04W 52/0216 370/311 |

OTHER PUBLICATIONS

International Search Report and Written Opinion—PCT/US2014/037076—ISA/EPO—Aug. 26, 2014.

* cited by examiner

TARGET WAKEUP TIME (TWT) GROUPING MODIFICATION

The present application for patent claims priority to U.S. Provisional Application No. 61/821,515, filed May 9, 2013, and to U.S. Provisional Application No. 61/823,106, filed May 14, 2013, both of which are assigned to the assignee of the present application and hereby expressly incorporated by reference herein in their entirety.

BACKGROUND

1. Field of the Invention

Certain aspects of the present disclosure generally relate to wireless communications and, more particularly, to enabling hierarchical wakeup schedules in a wireless system utilizing relays.

2. Relevant Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

Certain aspects of the present disclosure provide an apparatus for wireless communications. The apparatus generally includes a processing system configured to determine, for one or more wireless devices in a group, an offset value relative to a reference time, said offset value being used to adjust target wakeup times and a transmitter configured to signal the offset value to the one or more wireless devices in the group.

Certain aspects of the present disclosure provide an apparatus for wireless communications. The apparatus generally includes a receiver configured to receive an offset value relative to a reference time to adjust target wakeup times for one or more wireless devices in a group and a processing system configured to apply the offset value to adjust a target wakeup time for the apparatus to enable radio functions.

Certain aspects of the present disclosure provide a method for wireless communications by an apparatus. The method generally includes determining, for one or more wireless devices in a group, an offset value relative to a reference time, said offset value being used to adjust target wakeup times and signaling the offset value to the one or more wireless devices in the group.

Certain aspects of the present disclosure provide a method for wireless communications by an apparatus. The method generally includes receiving an offset value relative to a reference time to adjust target wakeup times for one or more wireless devices in a group and applying the offset value to adjust a target wakeup time for the apparatus to enable radio functions.

Certain aspects of the present disclosure provide an apparatus for wireless communications by an apparatus. The apparatus generally includes means for determining, for one or more wireless devices in a group, an offset value relative to a reference time, said offset value being used to adjust target wakeup times and means for signaling the offset value to the one or more wireless devices in the group.

Certain aspects of the present disclosure provide an apparatus for wireless communications by an apparatus. The apparatus generally includes means for receiving an offset value relative to a reference time to adjust target wakeup times for one or more wireless devices in a group and means for applying the offset value to adjust a target wakeup time for the apparatus to enable radio functions.

Certain aspects of the present disclosure provide a program product for wireless communications by an apparatus, comprising a computer readable medium having instructions stored thereon. The instructions are generally for determining, for one or more wireless devices in a group, an offset value relative to a reference time, said offset value being used to adjust target wakeup times and signaling the offset value to the one or more wireless devices in the group.

Certain aspects of the present disclosure provide a program product for wireless communications by an apparatus, comprising a computer readable medium having instructions stored thereon. The instructions are generally for receiving an offset value relative to a reference time to adjust target wakeup times for one or more wireless devices in a group and applying the offset value to adjust a target wakeup time for the apparatus to enable radio functions.

Certain aspects of the present disclosure provide an access point. The access point generally includes at least one antenna, a processing system configured to determine, for one or more wireless devices in a group, an offset value relative to a reference time, said offset value being used to adjust target wakeup times, and a transmitter configured to signal, via the at least one antenna, the offset value to the one or more wireless devices in the group.

Certain aspects of the present disclosure provide a station. The station generally includes at least one antenna, a receiver configured to receive, via the at least one antenna, an offset value relative to a reference time to adjust target wakeup times for one or more wireless devices in a group, and a processing system configured to apply the offset value to adjust a target wakeup time for the apparatus to enable radio functions.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
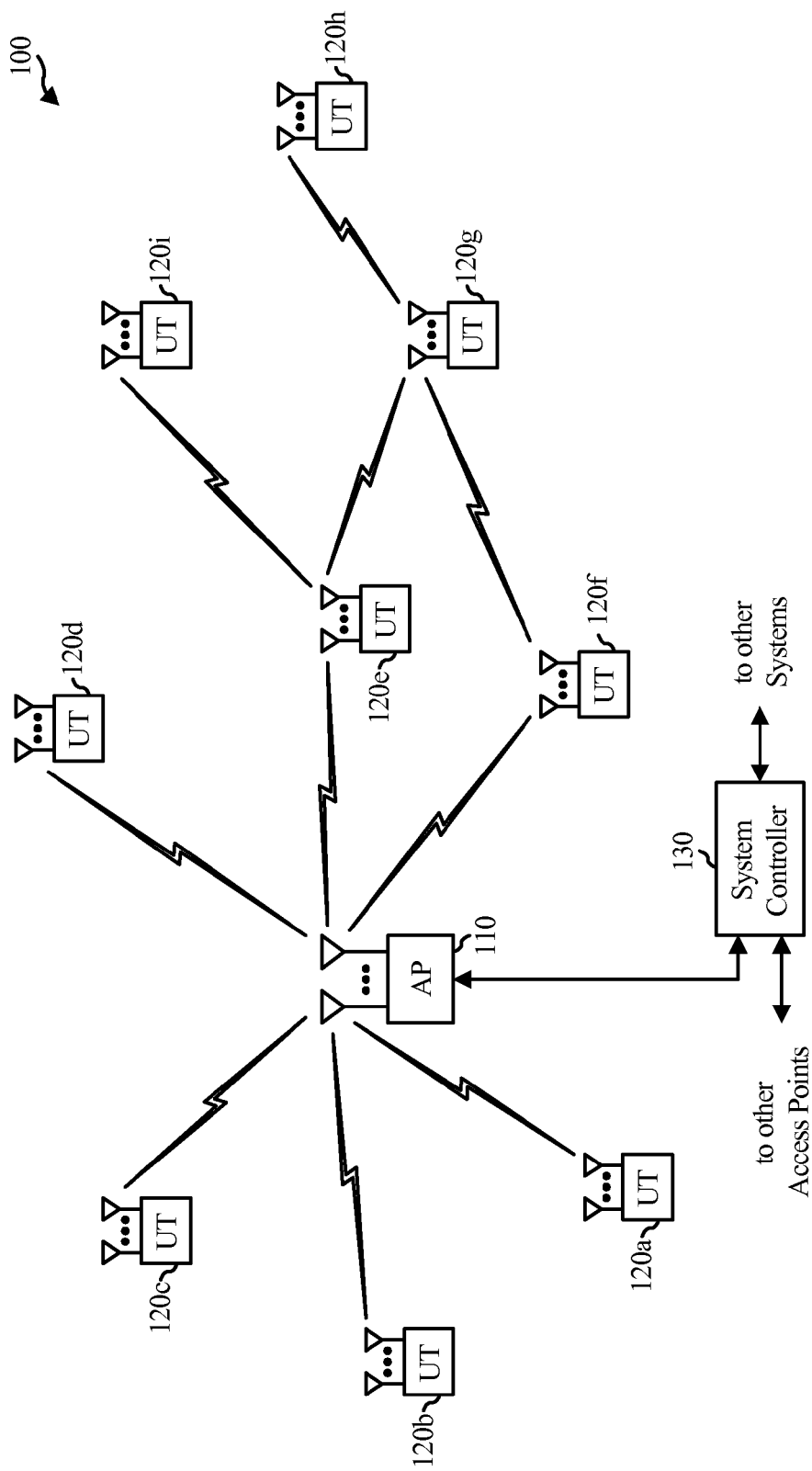
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
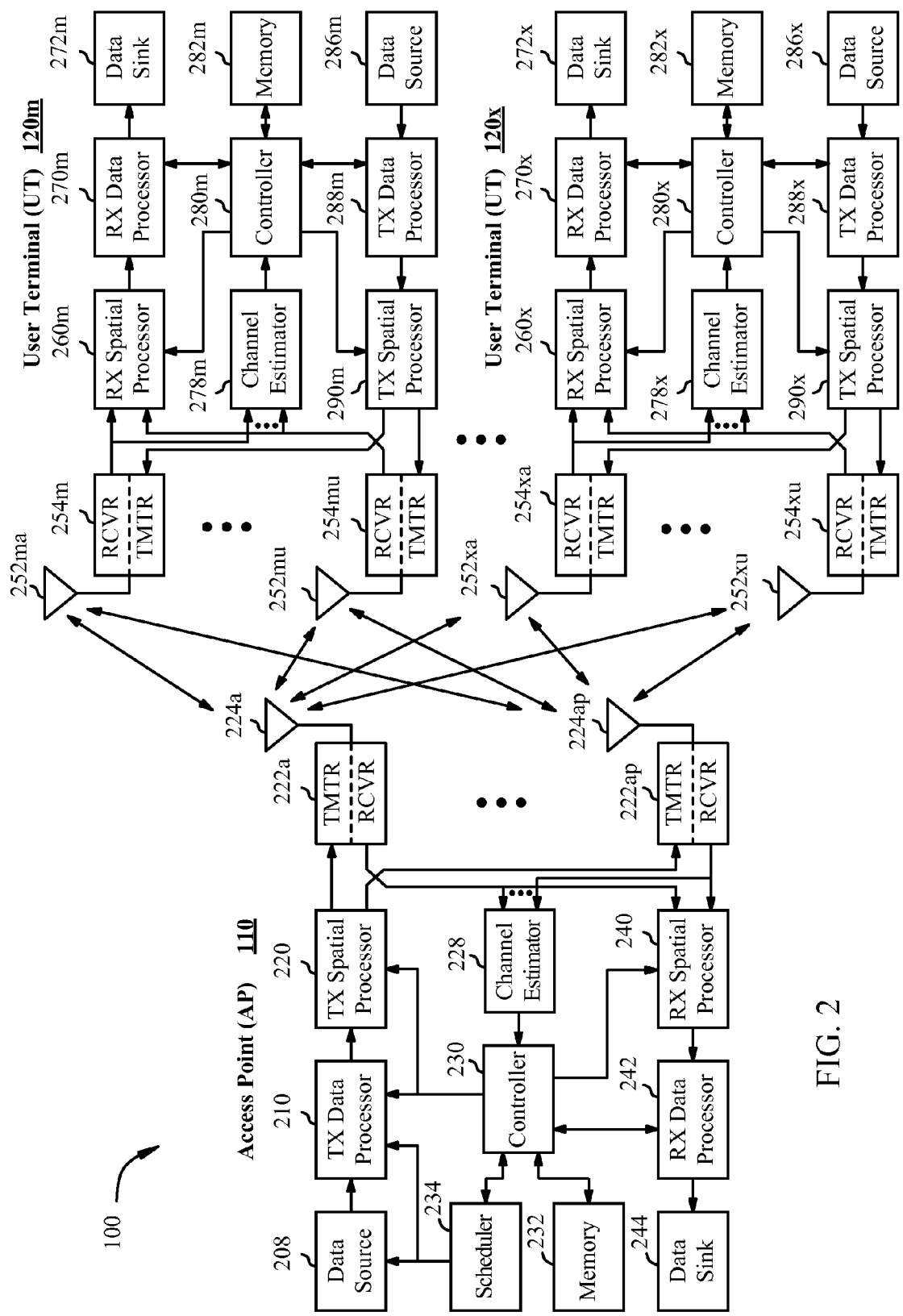
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
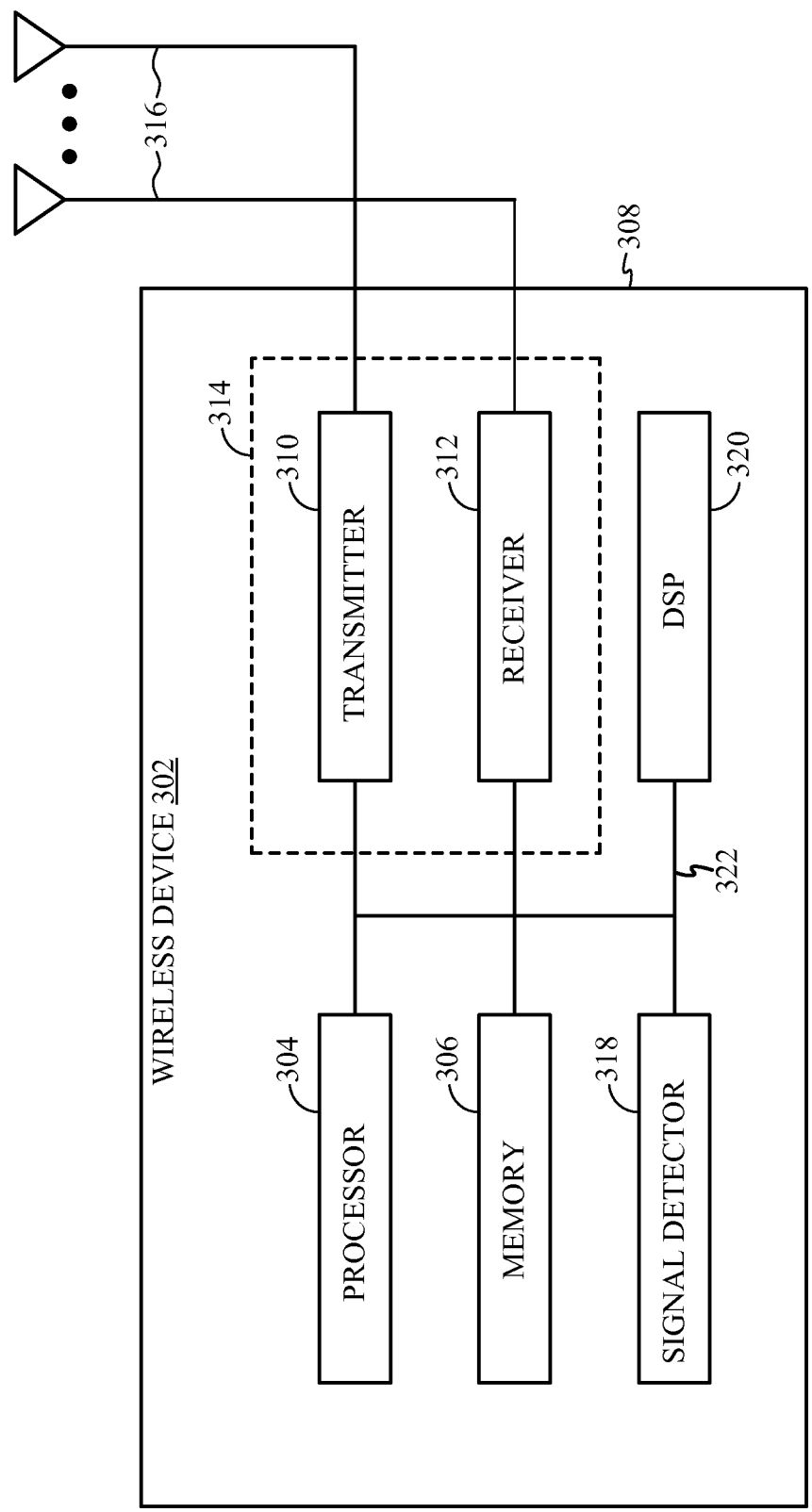
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Target Wakeup Time (TWT) Grouping

Some systems may utilize target wakeup times (TWTs) to allow certain stations (STAs) to power down certain radio functions to reduce power consumption. In such cases, a STA may send a request to an AP (or other type of STA) for a TWT, generally referring to a period in which the STA may power on radio functions to access a channel.

In response to a TWT request, the AP may indicate, via a TWT field in a TWT response frame, a time at which the STA is allowed to start to access the channel. The STA may keep certain radio functions disabled until the time indicated by the TWT. The STA may then wake up (and enable radio functions) at its TWT to access the channel. The use of TWTs may be particularly useful in cases where STAs transmit or receive data infrequently and/or typically transmit only small amounts of data. In some cases, the TWT may be specified in terms of a timing synchronization function (TSF) value.

In some cases, STAs utilizing TWTs (TWT STAs) may be grouped with a common Group ID (assigned via a TWT Group Assignment Field). The Group ID represents an identification of a set of STAs with adjacent TWT values. A Zero Offset of Group subfield indicates an initial TWT value within the range of TWT values within a TWT Group, while each STA in the TWT Group is assigned a TWT value indicating an offset from that Zero Offset. Thus, based on the assigned TWT value, a STA computes the difference between its TWT value and the Zero Phase Offset value.

Example Target Wakeup Time (TWT) Grouping Modification

In such case, an AP may decide to modify a group of TWT STAs, for example, to adjust the TWTs for all STAs in the group. Aspects of the present disclosure provide an example protocol in which the AP may be configured to efficiently modify a group of TWT STAs by sending uniform messages to each STA for group modification purposes.

In general, an AP and STA may perform similar (e.g., symmetric) operations. Therefore, for many of the techniques described herein, an AP or STA may perform similar operations. To that end, the following description may sometimes refer to an "AP/STA" to reflect that an operation may be performed by either. Although, it should be understood that even if only "AP" or "STA" is used, it does not mean a corresponding operation or mechanism is limited to that type of device.

Figure 4:
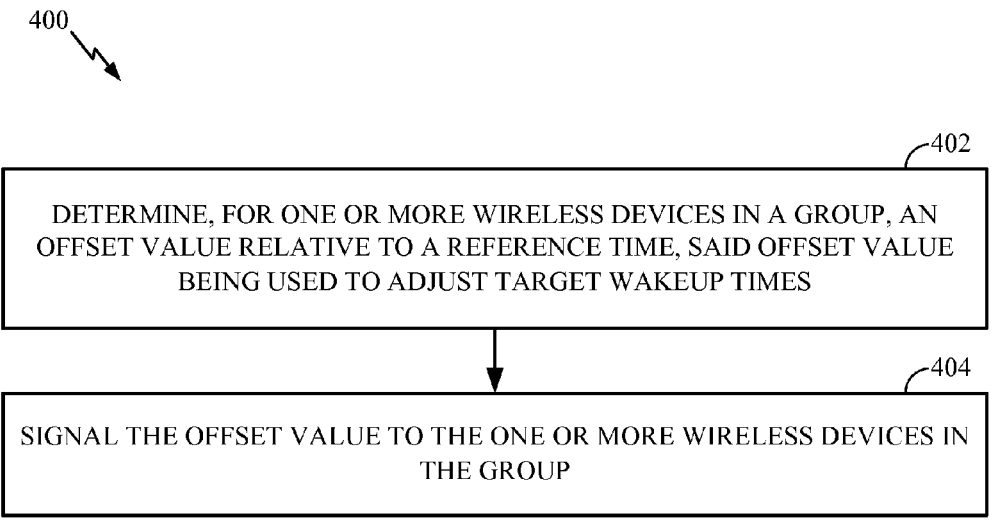
FIG. 4 illustrates a block diagram of example operations for wireless communications, for example, by an access point, in accordance with certain aspects of the present disclosure.

FIG. 4 is a block diagram of example operations 400 for group TWT modification, in accordance with aspects of the present disclosure. The operations 400 may be performed by an apparatus, such as an access point.

At 402, the apparatus determines, for one or more wireless devices in a group, an offset value relative to a reference time, said offset value being used to adjust target wakeup times. At 404, the apparatus signals the offset value to the one or more wireless devices in the group.

Figure 5:
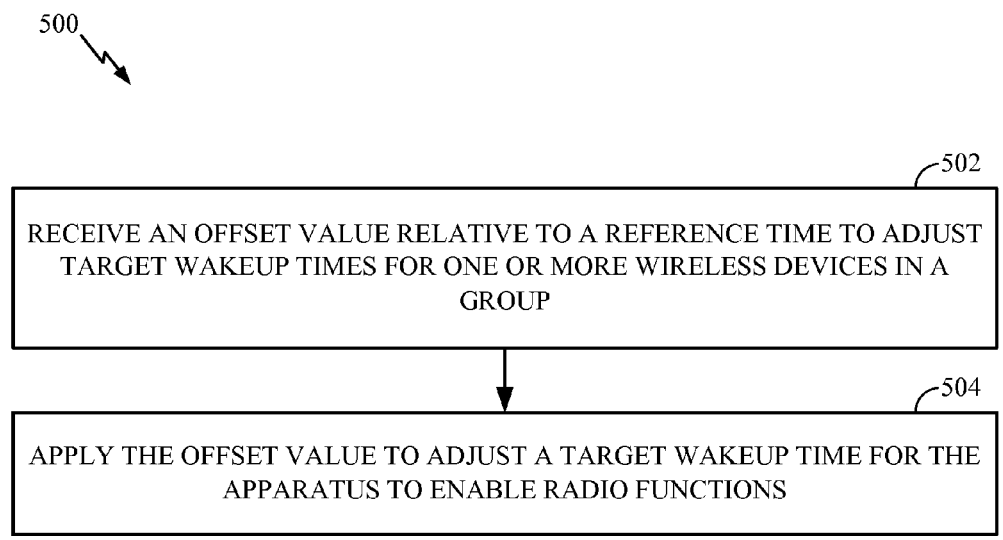
FIG. 5 illustrates a block diagram of example operations for wireless communications, for example, by a station, in accordance with certain aspects of the present disclosure.

FIG. 5 is a block diagram of example operations 500 for group TWT modification, in accordance with aspects of the present disclosure. The operations 500 may be performed by an apparatus, such as a TWT requester (e.g., a STA).

At 502, the apparatus receives an offset value relative to a reference time to adjust target wakeup times for one or more wireless devices in a group. At 504, the apparatus applies the offset value to adjust a target wakeup time for the apparatus to enable radio functions.

According to certain aspects, a information element (IE) may be used to indicate an adjustment to TWTs for devices in a group. This IE may be referred to as a "zero_offset_TWT_Group_change" IE or simply a "TWT_Group_change" IE.

Figure 6:
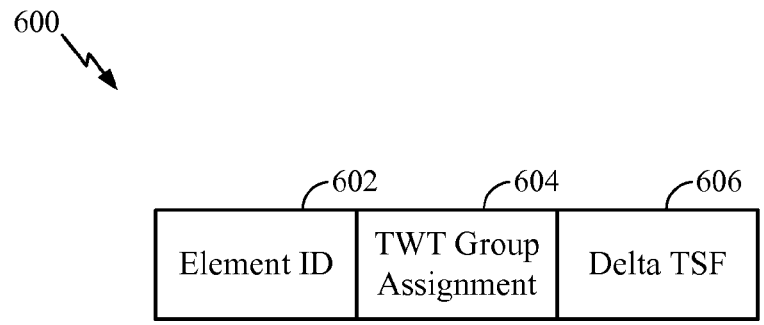
FIG. 6 illustrates an example exchange between a requestor and a responder, in accordance with aspects of the present disclosure.

As illustrated in FIG. 6, a TWT_Group_change IE 600 may include an Element ID 602 (indicating the type of IE) and a TWT Group Assignment field 604 to identify the corresponding group affected by the change. According to certain aspects, the change may be indicated by a change in time synchronization function ("delta TSF") field 606 that represents a change from the zero offset TWT of the indicated group from the existing time. This offset value, for example, may be a TSF value indicated by 6 bytes.

Figure 7:
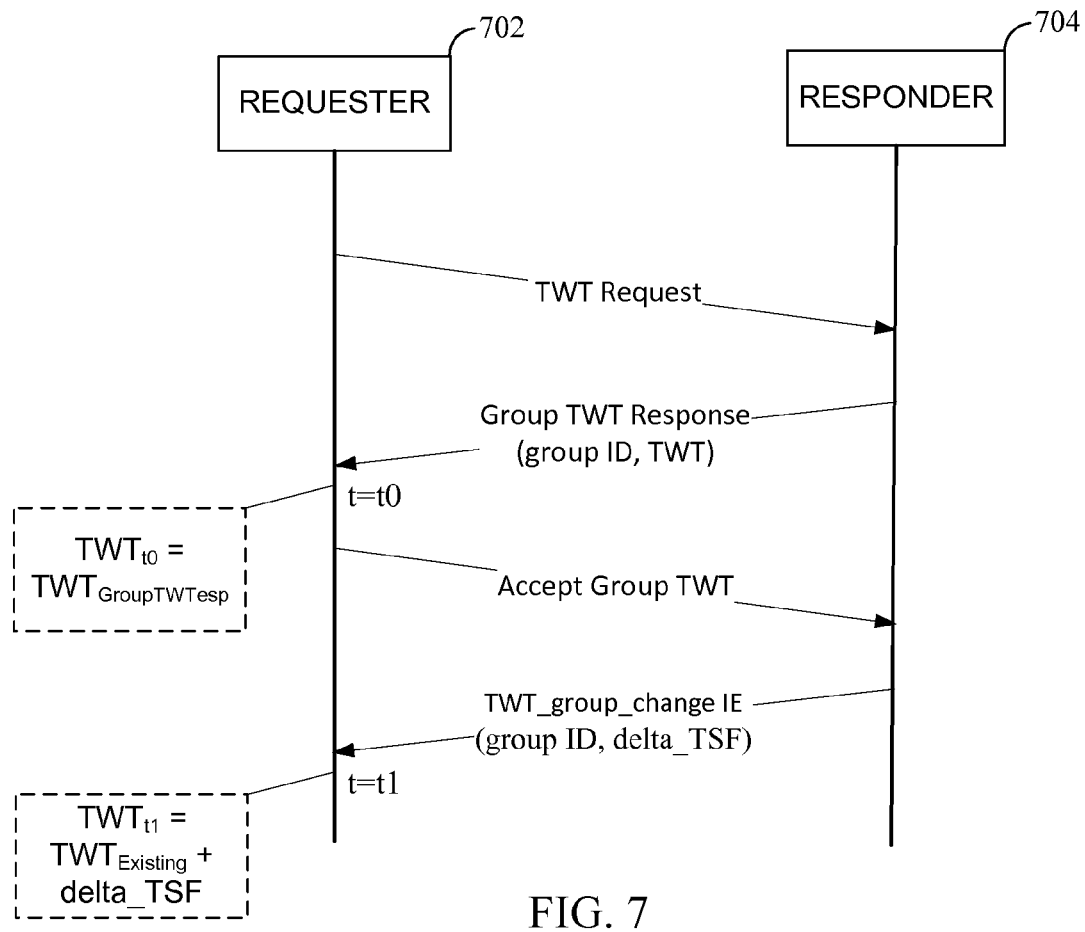
FIG. 7 illustrates an example information element (IE), in accordance with aspects of the present disclosure.

As illustrated in FIG. 7, the TWT Group change concept may be indicated by an exchange of messages between a TWT Requester 702 (e.g., a STA) and a recipient of the request or TWT Responder 704 (e.g., an AP). The TWT Requester may request a TWT and receive a TWT response with a TWT field that indicates the Requester STA's TWT and a group ID (e.g., via a TWT Group Assignment field).

In some cases, one or more bits in the response (e.g., in a field or subfield of an IE in the response) may indicate a presence of the group ID in the response. A receiving device may use these bits for detecting the presence of the group ID in the response. For example, the one or more bits may be set to zero to indicate no group ID is in the response. Further, the one or more bits may be set to a value to indicate the presence of a group ID and, in some cases, the bits may actually be set the value of the group ID.

In some cases, the TWT Requester may accept the Group TWT which, in some cases, may be indicated via a bit in a newly sent TWT Request (this bit may indicate the TWT requestor is capable of supporting group functions). As illustrated, the TWT Requester may initially (e.g., at time t=t0) set its TWT value to a value indicated in the Group TWT Response.

At a subsequent time (e.g., at time t=t1), if the TWT Requester receives a TWT_Group_change IE with the same TWT Group ID, it may update its TWT. For example, as illustrated in FIG. 7, the Requester 702 by adding the delta_TSF value indicated in the IE with its existing TWT value to get its new TWT time which it will follow moving forward (e.g., until receiving another TWT_Group_change_IE).

The offset value (e.g., in a TWT_Group_Change_IE) may be broadcast to wireless devices in the group or transmitted to at least one wireless device in the group via unicast signaling. Further, the TWT_Group_change_IE may be transmitted in a beacon, in an action frame, or via any other type of signaling mechanism. In some cases, the offset value may be transmitted via a management frame or in an explicit target wakeup time (TWT) response frame (e.g., STACK, TACK, or BAT).

Figure 4A:
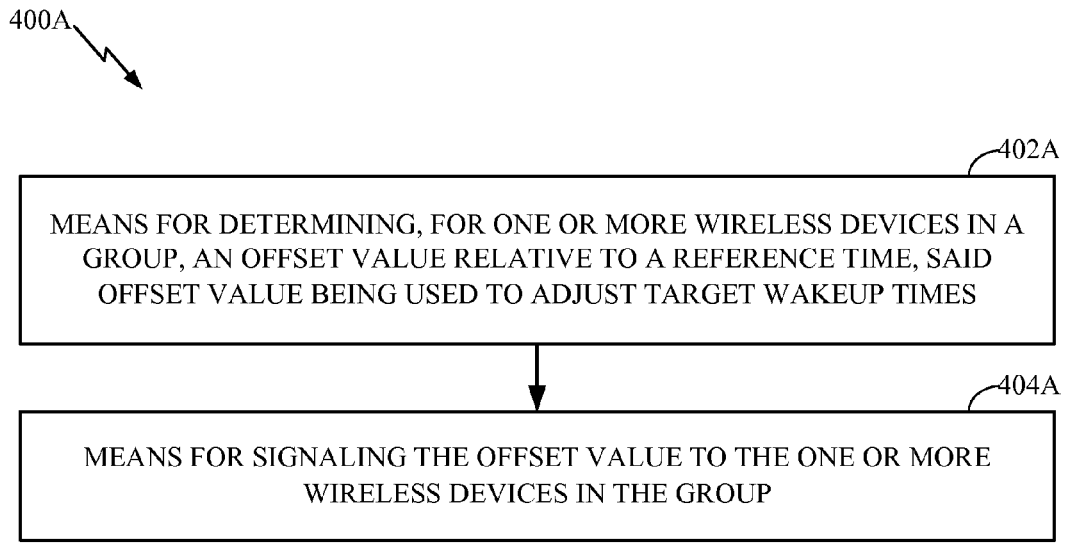
FIG. 4A illustrates example means capable of performing the operations shown in FIG. 4.
Figure 5A:
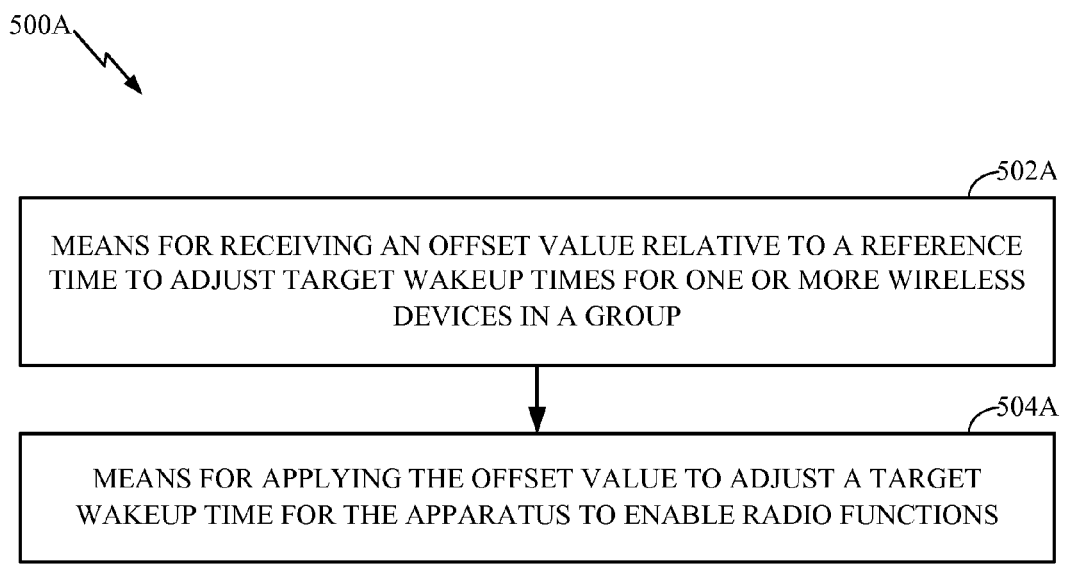
FIG. 5A illustrates example means capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 and 500 illustrated in FIGS. 4 and 5 correspond to means 400A and 500A illustrated in FIGS. 4A and 5A, respectively.

For example, means for transmitting or signaling may comprise a transmitter (e.g., the transmitter unit 222) and/or an antenna(s) 224 of the access point 110 illustrated in FIG. 2 or the transmitter 310 and/or antenna(s) 316 depicted in FIG. 3. Means for receiving may comprise a receiver (e.g., the receiver unit 222) and/or an antenna(s) 224 of the access point 110 illustrated in FIG. 2 or the receiver 312 and/or antenna(s) 316 depicted in FIG. 3. Means for processing, means for determining, and/or means for applying may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term receiver may refer to an RF receiver (e.g., of an RF front end) or an interface (e.g., of a processor) for receiving structures processed by an RF front end (e.g., via a bus). Similarly, the term transmitter may refer to an RF transmitter of an RF front end or an interface (e.g., of a processor) for outputting structures to an RF front end (e.g., via a bus).

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth.

A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a receiver configured to receive a request from a wireless device;
   a processing system configured to:
      determine the wireless device is capable of supporting group functions based on one more bits in the request; and
      determine, after receiving the request, for one or more wireless devices in the group, an offset value relative to a reference time, said offset value being used to adjust a target wakeup time; and
   a transmitter configured to signal the offset value to the one or more wireless devices in the group.

2. The apparatus of claim 1, wherein the transmitter is configured to signal the offset value to at least some of the wireless devices in the group via broadcast signaling.

3. The apparatus of claim 1, wherein the transmitter is configured to signal the offset value to at least one wireless device in the group via unicast signaling.

4. The apparatus of claim 1, wherein the transmitter is configured to signal the offset value to the one or more wireless devices in the group via at least one of a beacon, a management frame, or in an explicit target wakeup time (TWT) response frame.

5. The apparatus of claim 1, wherein the transmitter is configured to signal the offset value in an information element including an identification of the group.

6. The apparatus of claim 5, wherein the information element is transmitted in a response to the request.

7. The apparatus of claim 6, wherein the information element comprises one or more bits indicating presence of the identification of the group in the response.

8. An apparatus for wireless communications, comprising:
   a transmitter configured to transmit a request, the request comprising one or more bits indicating the apparatus is capable of supporting group functions;
   a receiver configured to receive, after transmitting the request, an offset value relative to a reference time to adjust a target wakeup time for one or more wireless devices in the group; and
   a processing system configured to apply the offset value to adjust the target wakeup time for the apparatus to enable radio functions.

9. The apparatus of claim 8, wherein the offset value is received via broadcast signaling.

10. The apparatus of claim 8, wherein the offset value is received via unicast signaling.

11. The apparatus of claim 8, wherein the offset value is received via at least one of a beacon, a management frame, or in an explicit target wakeup time (TWT) response frame.

12. The apparatus of claim 8, wherein the receiver is configured to receive the offset value in an information element including an identification of the group.

13. The apparatus of claim 12, wherein the information element is received in a response to the request.

14. The apparatus of claim 13, wherein the processing system is further configured to detect a presence of the identification of the group in the response, based on one or more bits in the response.

15. An apparatus for wireless communications, comprising:
   means for receiving a request from a wireless device;
   means for determining the wireless device is capable of supporting group functions based on one more bits in the request;
   means for determining, after receiving the request, for one or more wireless devices in the group, an offset value relative to a reference time, said offset value being used to adjust a target wakeup time; and
   means for signaling the offset value to the one or more wireless devices in the group.

16. The apparatus of claim 15, wherein the offset value is broadcast to wireless devices in the group.

17. The apparatus of claim 15, wherein the offset value is transmitted to at least one wireless device in the group via unicast signaling.

18. The apparatus of claim 15, wherein the offset value is transmitted via at least one of a beacon or an action frame.

19. The apparatus of claim 15, wherein the means for signaling is configured to signal the offset value in an information element including an identification of the group.

20. The apparatus of claim 19, wherein the information element is transmitted in a response to the request.

21. The apparatus of claim 20, wherein the information element comprises one or more bits indicating presence of the identification of the group in the response.

22. An apparatus for wireless communications, comprising:
   means for transmitting a request, the request comprising one or more bits indicating the apparatus is capable of supporting group functions;
   means for receiving, after transmitting the request, an offset value relative to a reference time to adjust a target wakeup time for one or more wireless devices in the group; and means for applying the offset value to adjust the target wakeup time for the apparatus to enable radio functions.

23. The apparatus of claim 22, wherein the offset value is received via broadcast signaling.

24. The apparatus of claim 22, wherein the offset value is received via unicast signaling.

25. The apparatus of claim 22, wherein the offset value is received via at least one of a beacon, a management frame, or in an explicit target wakeup time (TWT) response frame.

26. The apparatus of claim 22, wherein the means for receiving is configured to receive the offset value in an information element including an identification of the group.

27. The apparatus of claim 26 wherein the information element is received in a response to the request.

28. The apparatus of claim 27, further comprising means for detecting a presence of the identification of the group in the response, based on one or more bits in the response.

29. A method for wireless communications by an apparatus, comprising:
  receiving a request from a wireless device;
  determining the wireless device is capable of supporting group functions based on one more bits in the request;
  determining, after receiving the request, for one or more wireless devices in the group, an offset value relative to a reference time, said offset value being used to adjust a target wakeup time; and
  signaling the offset value to the one or more wireless devices in the group.

30. The method of claim 29, wherein the offset value is broadcast to wireless devices in the group.

31. The method of claim 29, wherein the offset value is transmitted to at least one wireless device in the group via unicast signaling.

32. The method of claim 29, wherein the offset value is transmitted via at least one of a beacon, a management frame, or in an explicit target wakeup time (TWT) response frame.

33. The method of claim 29, wherein the signaling comprises signaling the offset value in an information element including an identification of the group.

34. The method of claim 33, wherein the information element is transmitted in a response to the request.

35. The method of claim 34, wherein the information element comprises one or more bits indicating presence of the identification of the group in the response.

36. A method for wireless communications by an apparatus, comprising:
  transmitting a request, the request comprising one or more bits indicating the apparatus is capable of supporting group functions;
  receiving, after transmitting the request, an offset value relative to a reference time to adjust a target wakeup time for one or more wireless devices in the group; and
  applying the offset value to adjust the target wakeup time for the apparatus to enable radio functions.

37. The method of claim 36, wherein the offset value is received via broadcast signaling.

38. The method of claim 36, wherein the offset value is received via unicast signaling.

39. The method of claim 36, wherein the offset value is received via at least one of a beacon, a management frame, or in an explicit target wakeup time (TWT) response frame.

40. The method of claim 36, wherein receiving comprises receiving the offset value in an information element including an identification of the group.

41. The method of claim 40 wherein the information element is received in a response to the request.

42. The method of claim 41, further comprising detecting a presence of the identification of the group in the response, based on one or more bits in the response.

43. A non-transitory computer readable medium having instructions stored thereon for:
  receiving a request from a wireless device, the request comprising one or more bits indicating the wireless device is capable of supporting group functions;
  determining, after receiving the request, for one or more wireless devices in the group, an offset value relative to a reference time, said offset value being used to adjust a target wakeup time; and
  signaling the offset value to the one or more wireless devices in the group.

44. A non-transitory computer readable medium having instructions stored thereon for:
  transmitting, by an apparatus, a request, the request comprising one or more bits indicating the apparatus is capable of supporting group functions;
  receiving, after transmitting the request, an offset value relative to a reference time to adjust a target wakeup time for one or more wireless devices in the group; and
  applying the offset value to adjust the target wakeup time for the apparatus to enable radio functions.

45. An access point, comprising:
  at least one antenna;
  a receiver configured to receive a request from a wireless device;
  a processing system configured to:
    determine the wireless device is capable of supporting group functions based on one more bits in the request; and
    determine, after receiving the request, for one or more wireless devices in the group, an offset value relative to a reference time, said offset value being used to adjust a target wakeup time; and
  a transmitter configured to signal, via the at least one antenna, the offset value to the one or more wireless devices in the group.

46. A station, comprising:
  at least one antenna;
  a transmitter configured to transmit a request, the request comprising one or more bits indicating the station is capable of supporting group functions;
  a receiver configured to receive, after the request, via the at least one antenna, an offset value relative to a reference time to adjust a target wakeup time for one or more wireless devices in the group; and
  a processing system configured to apply the offset value to adjust the target wakeup time for the apparatus to enable radio functions.

* * * * *

UNITED STATES PATENT AND TRADEMARK OFFICE
CERTIFICATE OF CORRECTION

PATENT NO. : 9,462,550 B2  
APPLICATION NO. : 14/271169  
DATED : October 4, 2016  
INVENTOR(S) : Amin Jafarian et al.

Page 1 of 1

It is certified that error appears in the above-identified patent and that said Letters Patent is hereby corrected as shown below:

In the Claims

Claim 46, Column 16, Line 58 should read as follows:
"to adjust the target wakeup time for the station to"

Signed and Sealed this  
Twenty-third Day of May, 2017

Michelle K. Lee  
*Director of the United States Patent and Trademark Office*